(12) United States Patent
Hung

(10) Patent No.: US 11,624,473 B2
(45) Date of Patent: Apr. 11, 2023

(54) WALL-MOUNTED SUPPORT DEVICE

(71) Applicant: MODERNSOLID INDUSTRIAL CO., LTD., Taichung (TW)

(72) Inventor: Chin-Jui Hung, Taichung (TW)

(73) Assignee: MODERNSOLID INDUSTRIAL CO., LTD., Taichung (TW)

( * ) Notice: Subject to any disclaimer, the term of this patent is extended or adjusted under 35 U.S.C. 154(b) by 29 days.

(21) Appl. No.: 17/369,921

(22) Filed: Jul. 7, 2021

(65) Prior Publication Data

US 2022/0034445 A1 Feb. 3, 2022

(30) Foreign Application Priority Data

Jul. 29, 2020 (TW) ................. 109125617

(51) Int. Cl.
*F16M 11/04* (2006.01)
*A47B 5/00* (2006.01)
*F16M 13/02* (2006.01)

(52) U.S. Cl.
CPC ............ *F16M 11/046* (2013.01); *A47B 5/00* (2013.01); *F16M 13/02* (2013.01); *F16M 2200/025* (2013.01)

(58) Field of Classification Search
CPC ........... F16M 11/046; F16M 2200/025; F16M 13/02; A47B 5/00; A47B 9/10; A47B 9/04; A47B 9/20; F16F 9/0245; F16F 9/0254; F16F 9/0263
USPC ...................................................... 248/274.1
See application file for complete search history.

(56) References Cited

U.S. PATENT DOCUMENTS

| | | | | |
|---|---|---|---|---|
| 3,563,349 A * | 2/1971 | Spieth | ...................... | A47B 9/10 188/300 |
| 9,279,537 B2 * | 3/2016 | Hung | ................... | F16M 11/425 |
| 9,976,699 B2 * | 5/2018 | Hung | ..................... | F16M 11/24 |
| 10,376,042 B1 * | 8/2019 | Johnson | ................ | F16M 11/06 |
| 2005/0173596 A1 * | 8/2005 | Herzog | ............... | H02G 3/0418 248/49 |

(Continued)

FOREIGN PATENT DOCUMENTS

| CN | 205877661 U | 1/2017 |
|---|---|---|
| TW | M606029 U | 1/2021 |

OTHER PUBLICATIONS

Search Report appended to an Office Action, which was issued to Taiwanese counterpart application No. 109125617 by the TIPO dated May 24, 2021, with an English translation thereof.

*Primary Examiner* — Christopher Garft

(74) *Attorney, Agent, or Firm* — Hammer & Associates, P.C.

(57) ABSTRACT

A support device includes a slide frame defining a receiving space that has an opening suitable for facing a wall surface, a sliding unit slidable on the slide frame and suitable for connection with at least one of a display screen and a work platform, and a load-adjusting unit disposed in the receiving space, connected to the slide frame and the sliding unit, and switchable between a movable state, in which it is movable and brings the sliding unit to move therealong, and a locked state, in which it generates a supporting force that supports the sliding unit to maintain at a desired fixed point. A control unit is disposed on the sliding unit and includes an operating member for controlling the movement of the load-adjusting unit.

8 Claims, 10 Drawing Sheets

(56) References Cited

U.S. PATENT DOCUMENTS

| | | | | |
|---|---|---|---|---|
| 2007/0095994 | A1* | 5/2007 | Root | F16M 11/046 |
| | | | | 248/285.1 |
| 2012/0256069 | A1* | 10/2012 | Fallows | F16M 11/046 |
| | | | | 248/295.11 |
| 2014/0034799 | A1* | 2/2014 | Fallows | F16M 13/022 |
| | | | | 248/297.21 |
| 2015/0354746 | A1* | 12/2015 | Hung | F16M 13/02 |
| | | | | 248/200.1 |
| 2017/0159879 | A1* | 6/2017 | Hung | F16M 11/24 |
| 2017/0198779 | A1* | 7/2017 | Batsch | F16F 9/06 |
| 2019/0101240 | A1 | 4/2019 | Hsu et al. | |
| 2022/0034445 | A1* | 2/2022 | Hung | A47B 5/00 |

\* cited by examiner

WALL-MOUNTED SUPPORT DEVICE

CROSS-REFERENCE TO RELATED APPLICATION

This application claims priority of Taiwanese Patent Application No. 109125617, filed on Jul. 29, 2020.

FIELD

The disclosure relates to a wall-mounted support device suitable for carrying a monitor and a work platform.

BACKGROUND

Referring to FIG. 1, a conventional support device 1, as disclosed in Taiwanese Patent No. M521868, mainly includes a slide frame 11 defining a receiving space 10 and having a rear wall fixed on a wall surface, a sliding unit 14 slidably disposed on the slide frame 11 and supporting a display screen 12 and a work platform 13, and a load-adjusting unit 15 disposed in the receiving space 10. The load-adjusting unit 15 includes at least one tension spring 151 for biasing the sliding unit 14 to move between an upper limiting position and a lower limiting position. Because the slide frame 11 has front, rear, left and right walls cooperatively defining the receiving space 10 for receiving the load-adjusting unit 15, a thickness of the slide frame 11 that is perpendicular to the wall surface is large.

SUMMARY

Therefore, an object of the present disclosure is to provide a wall-mounted support device that is thin.

Accordingly, a support device of this disclosure is suitable for mounting on a wall surface and is suitable for connection with at least one of a display screen and a work platform. The support device comprises a slide frame, a sliding unit, a load-adjusting unit and a control unit. The slide frame includes a front plate extending along a length direction, and two side plates respectively connected to two opposite lateral sides of the front plate and spaced apart from each other in a width direction transverse to the length direction. The side plates and the front plate cooperatively define a receiving space that has an opening suitable for facing the wall surface. Each side plate further cooperates with the front plate to define a slide groove that has an opening opposite to the opening of the receiving space.

The sliding unit is slidable on the slide frame in the length direction and is suitable for connection with the at least one of the display screen and the work platform. The sliding unit has two sliding portions spaced apart from each other in the width direction. Each sliding portion is slidably disposed in the slide groove defined by the front plate and a corresponding one of the side plates. The load-adjusting unit is disposed in the receiving space and is connected to the slide frame and the sliding unit. The load-adjusting unit is switchable between a movable state, in which the load-adjusting unit is movable to extend and retract in the length direction and brings the sliding unit to move therealong, and a locked state, in which the load-adjusting unit generates a supporting force that supports the sliding unit to maintain at a desired fixed point. The control unit is disposed on the sliding unit and includes an operating member for controlling the movement of the load-adjusting unit.

BRIEF DESCRIPTION OF THE DRAWINGS

Other features and advantages of the present disclosure will become apparent in the following detailed description of the embodiment with reference to the accompanying drawings, of which.

DETAILED DESCRIPTION

Figure 1:
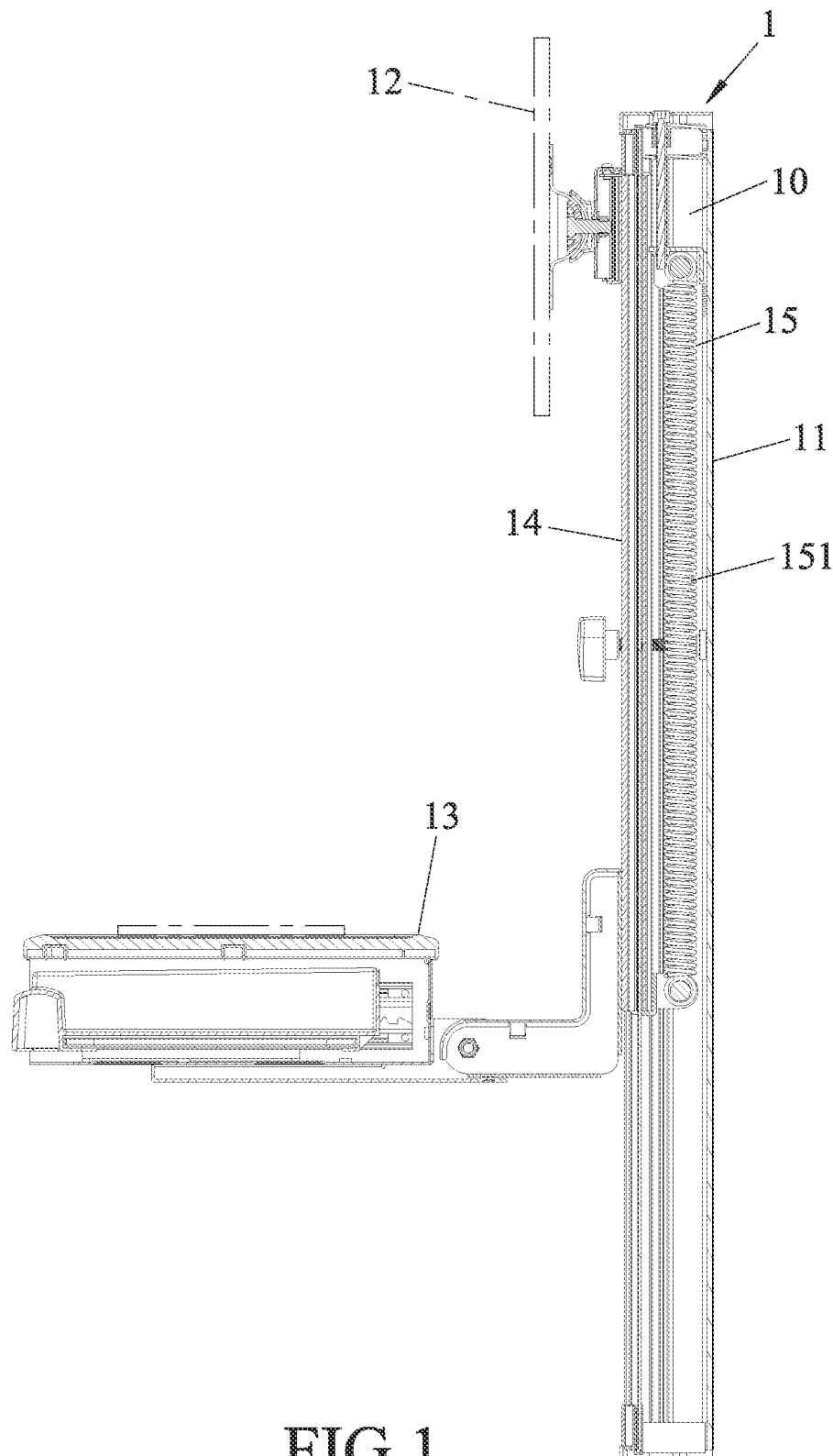
FIG. 1 is a side sectional view of a conventional support device disclosed in Taiwanese Patent No. M521868.

Referring to FIGS. 2 to 5, a support device according to an embodiment of the present disclosure is suitable for mounting on a wall surface 2, and is suitable for connection with a display screen 31 and a work platform 32. The support device of this embodiment comprises a slide frame 4, a sliding unit 5, a load-adjusting unit 6, and a control unit 7.

The slide frame 4 includes a front plate 41 extending in a length direction (Z), two side plates 42 respectively connected to two opposite lateral sides of the front plate 41 and spaced apart from each other in a width direction (X) transverse to the length direction (Z), two end plates 44, and two decorative plates 45. In this embodiment, the length direction (Z) is a top-bottom direction, the width direction (X) is a left-right direction, and a thickness direction (Y) transverse to the length direction (Z) and the width direction (X) is a front-rear direction.

The front plate 41 has a passage 411 formed therethrough and extending in the length direction (Z).

The side plates 42 and the front plate 41 cooperatively define a receiving space 43 having an opening 431 suitable for facing the wall surface 2. The receiving space 43 communicates with an external environment through the passage 411. Each side plate 42 has a flank portion 421 spaced apart from the front plate 41 in the width direction (X), a plate-connecting portion 423 connected between the front plate 41 and the flank portion 421 and cooperating with the same to define a slide groove 422, and a wall-connecting portion 424 that is connected to a junction of the flank portion 421 and the plate-connecting portion 423, that is spaced apart from the front plate 41 in the thickness direction (Y), and that is suitable for connection with the wall surface 2. The flank portion 421 has a first engaging portion 425 formed on one end thereof. The slide groove 422 has an opening 4221 opposite to the opening 431 of the receiving space 43. The wall-connecting portion 424 has a second engaging portion 426 formed on one end thereof. In this embodiment, the plate-connecting portion 423 has an L-shape, the first engaging portion 425 is a recess portion, and the second engaging portion 426 is a protruding portion.

Each end plate 44 is connected to one end of the front plate 41 and corresponding one ends of the side plates 42. Through this, the end plates 44 respectively cover top and bottom ends of the slide frame 4.

Each decorative plate 45 is detachably connected to a respective one of the side plates 42, and cooperates with the same to define a wire-embedding space 46. Each decorative plate 45 has a third engaging portion 451 and a fourth engaging portion 452 formed on two opposite ends thereof. The third engaging portion 451 is a protruding portion that engages with the first engaging portion 425, while the fourth engaging portion 452 is a recess portion that engages with the second engaging portion 426. The wire-embedding space 46 allows wires of the display screen 31 to pass therethrough and to be hidden between the side plate 42 and the respective decorative plate 45.

The sliding unit 5 includes a sliding member 51 slidable on the slide frame 4 in the length direction (Z), a mounting seat 52 connected to the sliding member 51 and suitable for connection with the display screen 31, and a pivot seat 53 connected to the sliding member 51 and suitable for connection with the work platform 32. The sliding member 51 has two sliding portions 511 spaced apart from each other in the width direction (X). Each sliding portion 511 has an L-shape, and is slidably disposed in the slide groove 422 defined by the front plate 41 and a corresponding one of the side plates 42. The pivot seat 53 is spaced apart from the mounting seat 52 in the length direction (Z), and is located at a height lower than that of the mounting seat 52.

Figure 8:
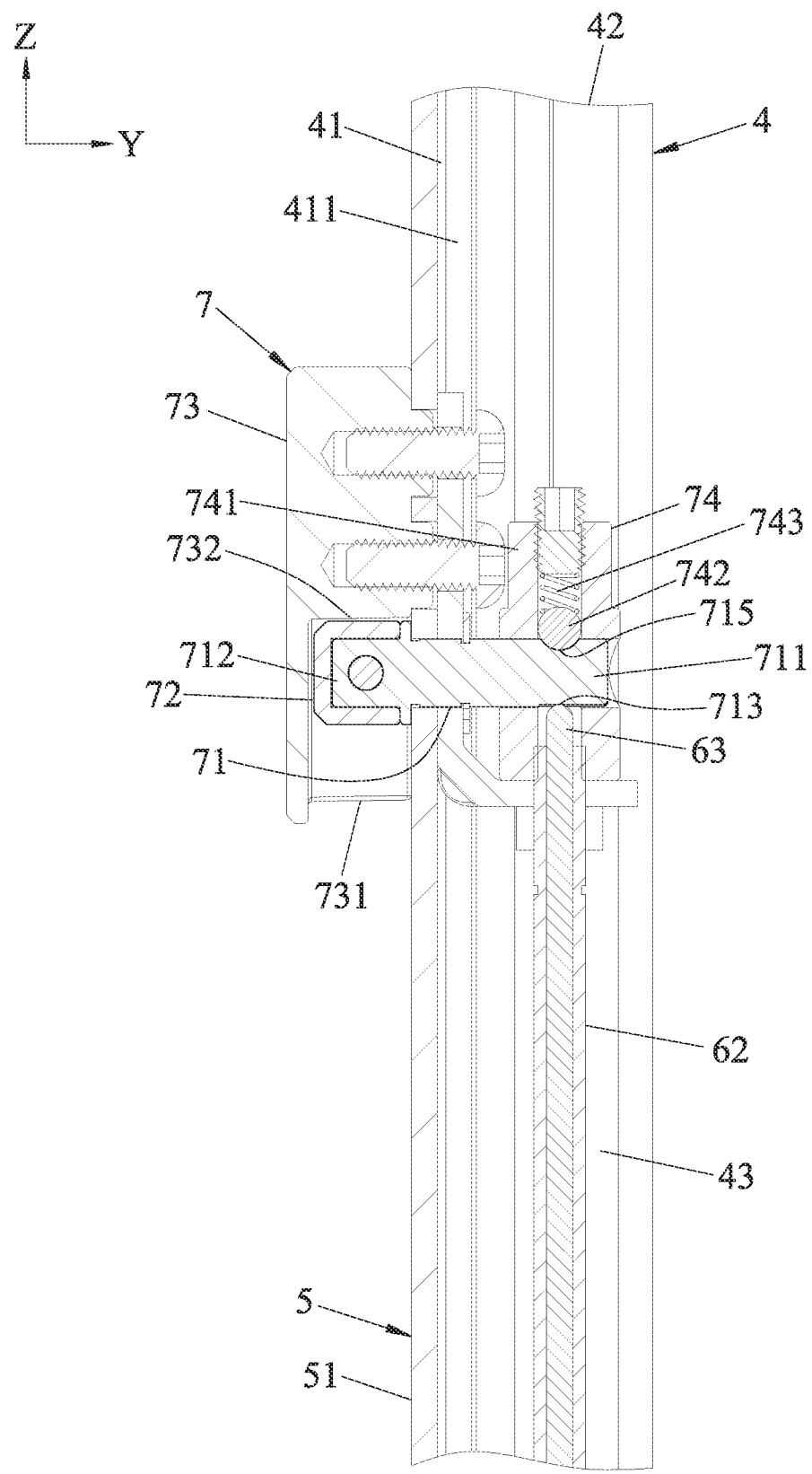
FIG. 8 is a view similar to FIG. 6, but illustrating the load-adjusting unit in a movable state.

The load-adjusting unit 6 is disposed in the receiving space 43, and is connected to the slide frame 4 and the sliding unit 5. The load-adjusting unit 6 is switchable between a movable state and a locked state. In the movable state, as shown in FIG. 8, the load-adjusting unit 6 is movable to extend and retract in the length direction (Z), and brings the sliding unit 5 to move therealong. In the locked state, as shown in FIG. 6, the load-adjusting unit 6 generates a supporting force that supports the sliding unit 5 to maintain at a desired fixed point.

Figure 3:
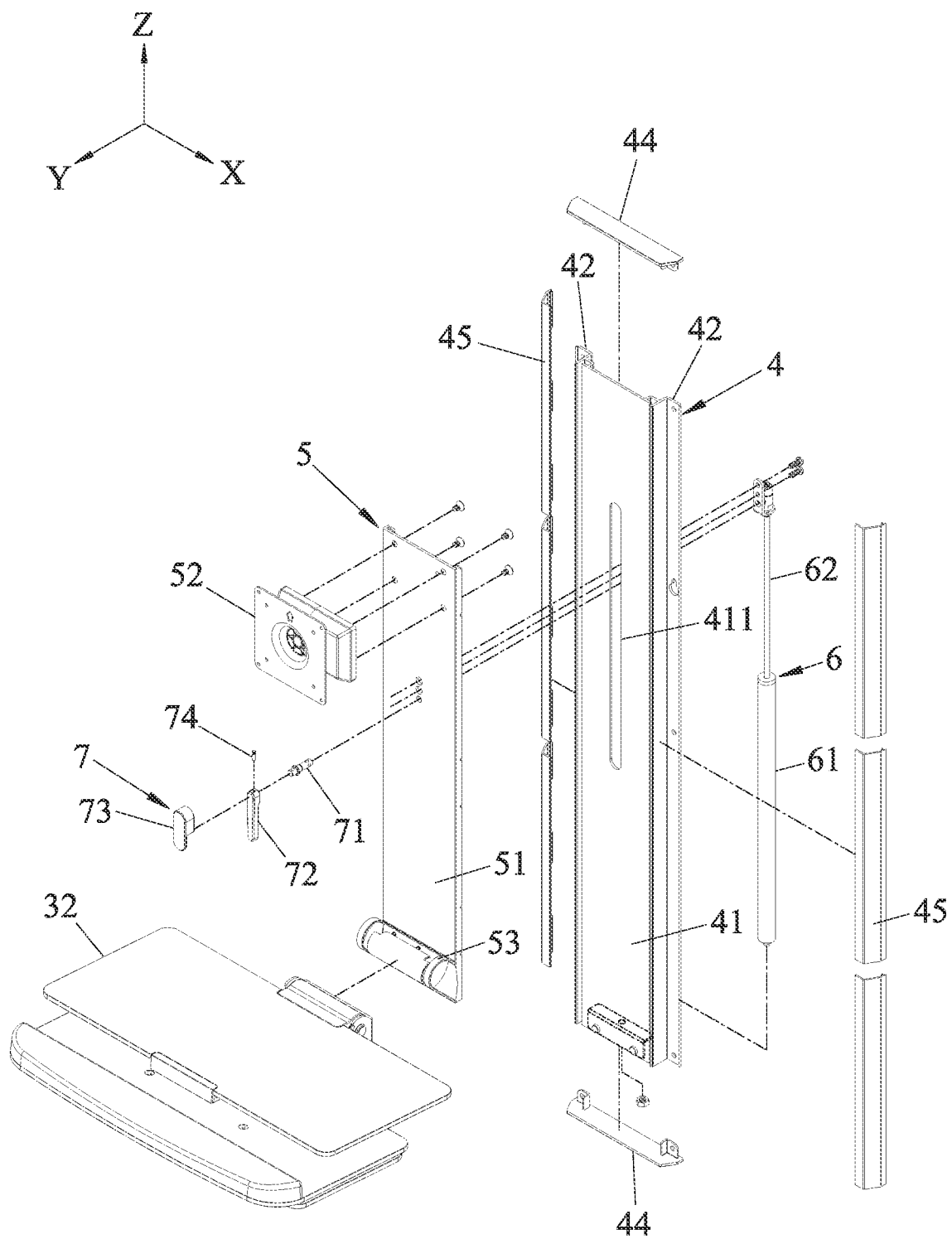
FIG. 3 is an exploded perspective view of the embodiment.
Figure 4:
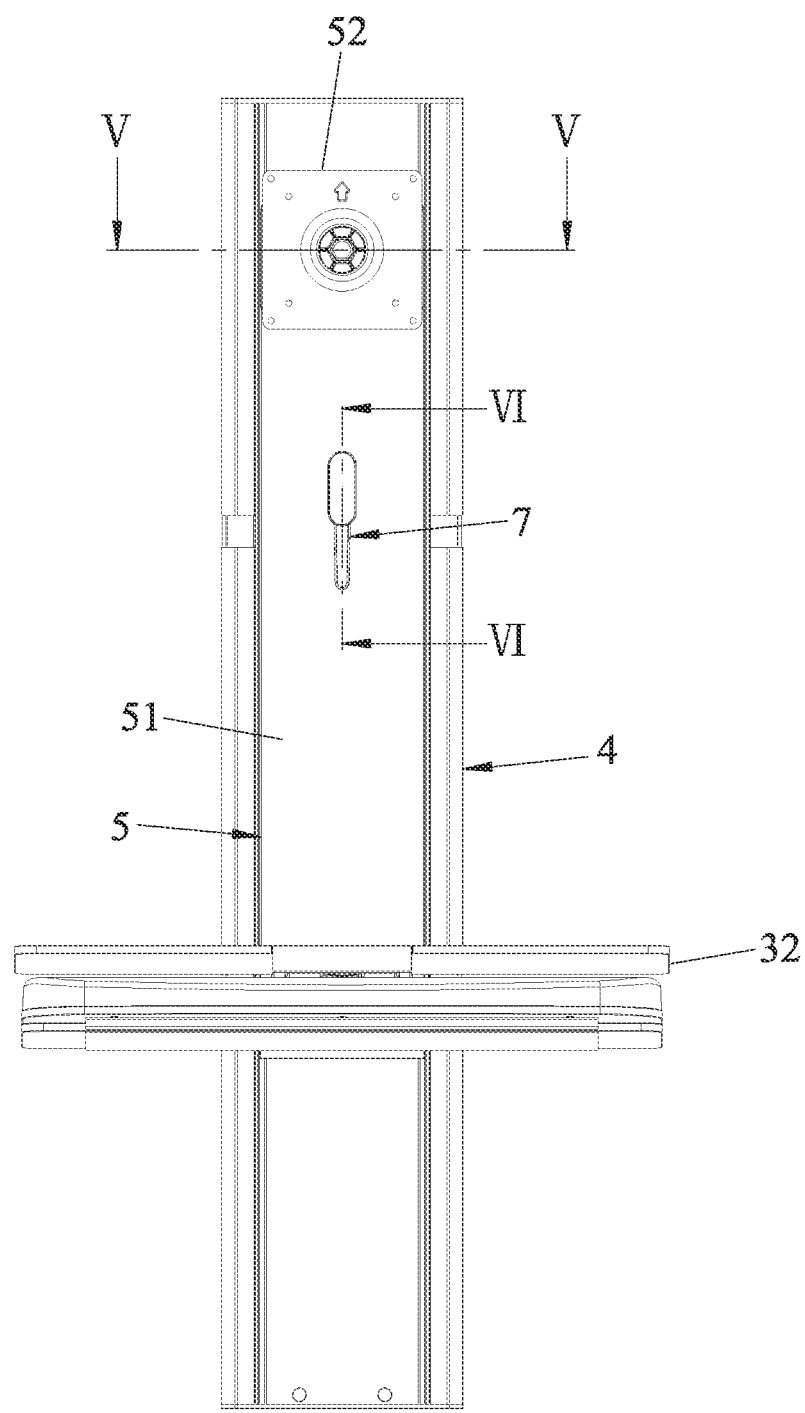
FIG. 4 is a schematic front view of the embodiment.
Figure 6:
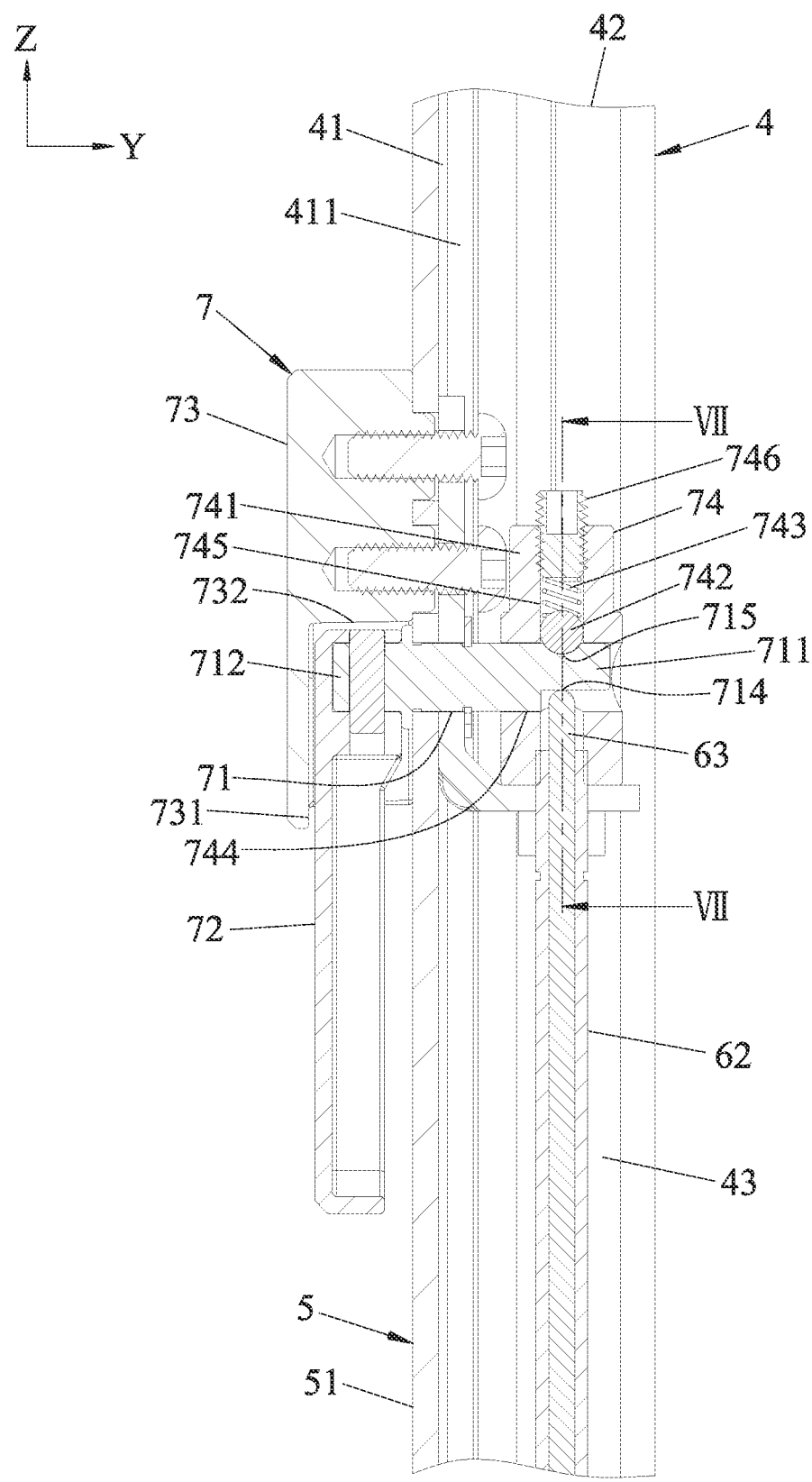
FIG. 6 is a sectional view of the embodiment taken along line VI-VI of FIG. 4.
Figure 7:
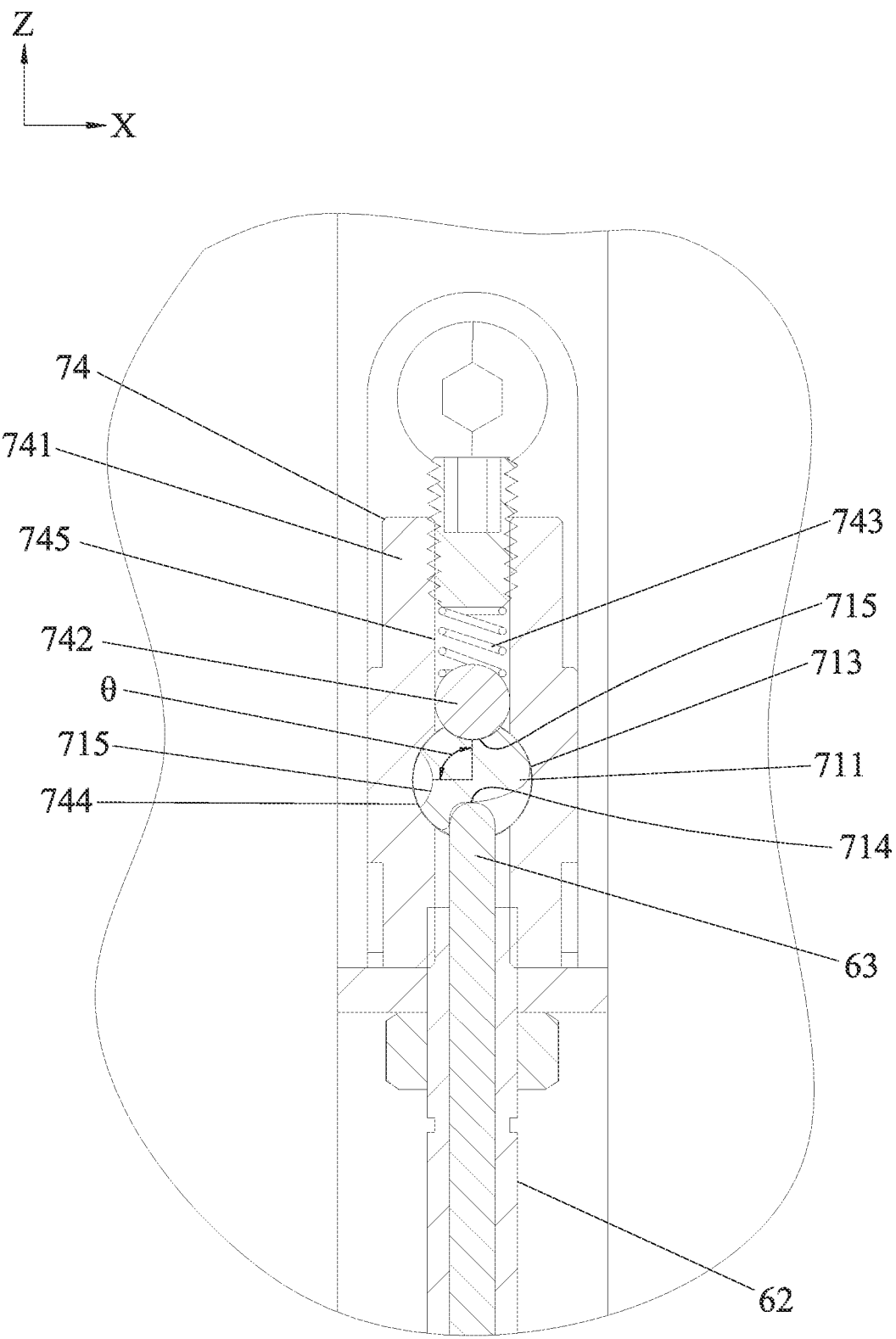
FIG. 7 is an enlarged sectional view of the embodiment taken along line VII-VII of FIG. 6.

Referring to FIGS. 6 and 7, in combination with FIG. 3, in this embodiment, the load-adjusting unit 6 includes a cylinder body 61 connected to the front plate 41, a piston rod 62 retractably disposed in the cylinder body 61 and connected to the sliding unit 5, and a valve stem 63 extending through the piston rod 62. The valve stem 63 is used for preventing retractable movement of the piston rod 62 to place the load-adjusting unit 6 in the locked state, and is also used for allowing retractable movement of the piston rod 62 to place the load-adjusting unit 6 in the movable state.

In this embodiment, the load-adjusting unit 6 is a locking cylinder generally sold in the market. The cylinder body 61 is filled with an air or hydraulic pressure source. A portion of the piston rod 62 located inside the cylinder body 61 divides an interior of the cylinder body 61 into upper and lower chambers. When the load-adjusting unit 6 is in the movable state, a valve hole in the piston rod 62 is opened by the valve stem 63, so that the air or hydraulic pressure source can flow smoothly and unobstructed in the upper and lower chambers. When the load-adjusting unit 6 is in the locked state, the valve hole in the piston rod 62 is closed by the valve stem 63, so that the air or hydraulic pressure source cannot flow.

The control unit 7 is disposed on the sliding unit 5, and includes a bolt 71, an operating member 72, a limiting cap 73, and a limiting assembly 74.

Referring to FIG. 8, in combination with FIG. 7, the bolt 71 is rotatably inserted through the sliding member 51 and the passage 411, and has an eccentric portion 711 located in the receiving space 43, and a drive portion 712 opposite to the eccentric portion 711. The eccentric portion 711 has a first contact face 713 and a second contact face 714 for contact with the valve stem 63 and having a position difference in the length direction (Z), and two concave portions 715 spaced apart by an angle (θ). When the first contact face 713 contacts the valve stem 63, it presses the valve stem 63 and allows the piston rod 62 to extend and retract. When the second contact face 714 contacts the valve stem 63, the valve stem 63 is released from being pressed, and the piston rod 62 is prevented from extending and retracting. The angle (θ) ranges from 60 to 100 degrees. Preferably, the angle (θ) is 90 degrees.

The operating member 72 is operably connected to the drive portion 712 of the bolt 71.

The limiting cap 73 is connected to and cooperates with the sliding member 51 to define a first opening 731 and a second opening 732 for extension of the operating member 72 therethrough. The first opening 731 and the second opening 732 are immediately adjacent to and communicate with each other. The limiting cap 73 limits the rotation of the operating member 72 from the first opening 731 to the second opening 732 and vice versa. A range of rotation of the operating member 72 between the first opening 731 and the second opening 732 correspond to the angle (θ) between the concave portions 715.

The limiting assembly 74 includes a shaft seat 741, a ball 742, an elastic member 743, and a threaded rod 746. The shaft seat 741 is connected to the sliding member 51, and has a through hole 744 extending in the thickness direction (Y) for receiving the eccentric portion 711 of the bolt 71, and a through slot 745 extending in the length direction (Z) and communicating with the through hole 744. The through slot 745 allows the valve stem 63 and the limiting assembly 74 to pass therethrough in opposite directions. The elastic member 743 is disposed between the threaded rod 746 and the ball 742, while the ball 742 is disposed between the elastic member 743 and the eccentric portion 711 of the bolt 71. The elastic member 743 generates a biasing force for engaging the ball 742 with any one of the concave portions 715. When the ball 742 engages one of the concave portions 715, the eccentric portion 711 of the bolt 71 contacts the valve stem 63 through one of the first and second contact faces 713, 714. When the ball 742 engages the other concave portion 715, the eccentric portion 711 of the bolt 71 contacts the valve stem 63 through the other one of the first and second contact faces 713, 714.

Figure 2:
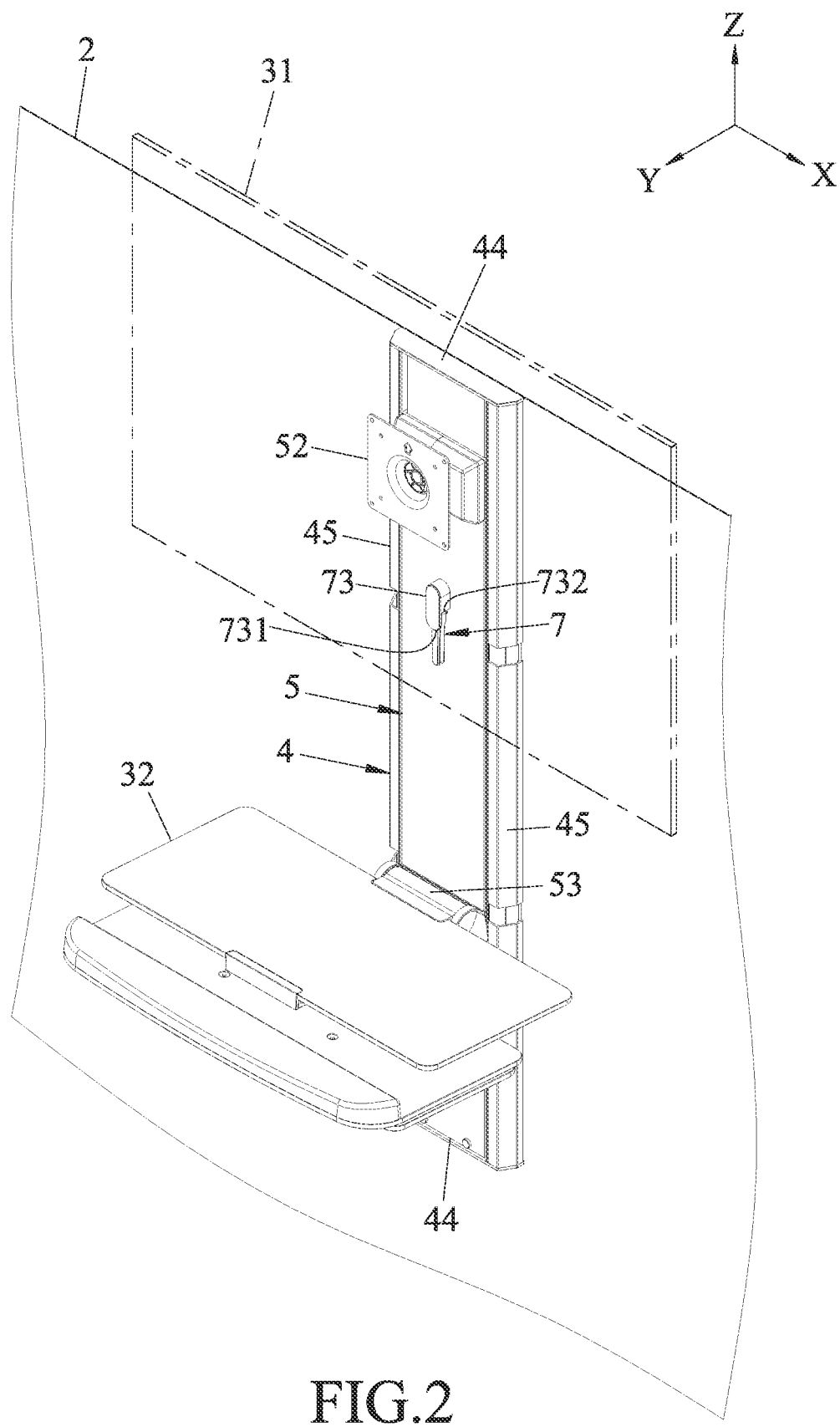
FIG. 2 is a perspective view of a wall-mounted support device according to an embodiment of the present disclosure.
Figure 5:
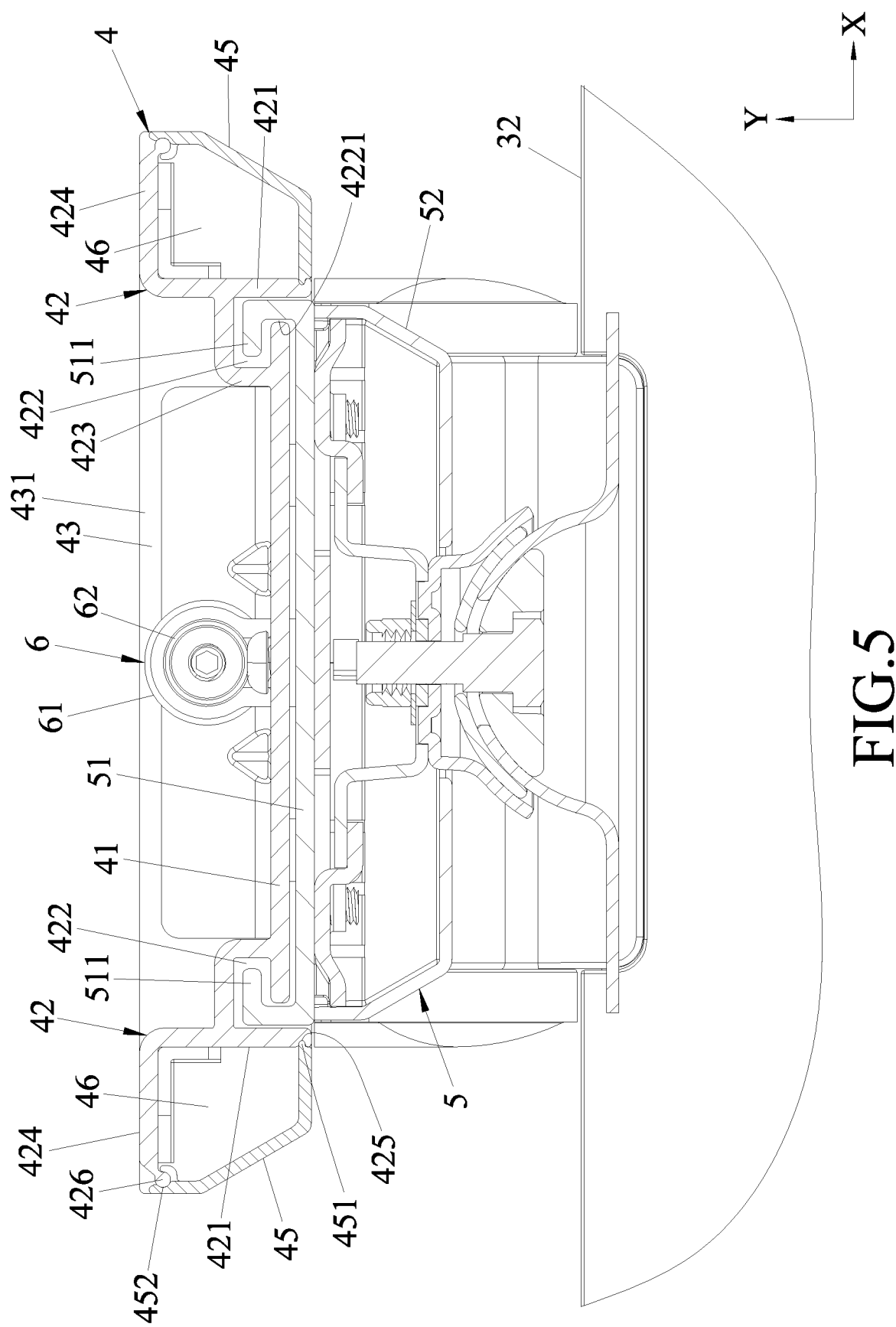
FIG. 5 is a sectional view of the embodiment taken along line V-V of FIG. 4, illustrating a load-adjusting unit in a locked state.

To use the support device of this embodiment, the slide frame 4 is simply fixed on the wall surface 2 through the wall-connecting portions 424 of the side plates 42, as shown in FIGS. 2 and 5, and the load-adjusting unit 6 in the receiving space 43 can be hidden between the slide frame 4 and the wall surface 2. Since the front plate 41 and the side plates 42 can cooperate with the wall surface 2 to hide the load-adjusting unit 6, the thickness of the slide frame 4 in the thickness direction (Y) can be reduced to a minimum, so that the support device of this disclosure can achieve the purpose of thinning.

With reference to FIGS. 5 to 7, when the load-adjusting unit 6 is in the locked state, the sliding member 51 together with the display screen 31 and the work platform 32 that are both connected to the sliding member 51 through the mounting seat 52 and the pivot seat 53, respectively, is maintained at a desired fixed point by the supporting force of the load-adjusting unit 6.

With reference to FIGS. 7 and 8, when a user rotates counterclockwise the operating member 72 from the first opening 731 to the second opening 732, the operating member 72 will drive the bolt 71 to synchronously rotate in the counterclockwise direction. During rotation, the biasing force of the elastic member 743 is overcome, and the ball 742 is pushed to slide out of one of the concave portions 715 and move to the other concave portion 715 so as to position the bolt 71. At this time, the second contact face 714 of the eccentric portion 711 of the bolt 71 is moved away from the valve stem 63, while the first contact face 713 thereof is moved to contact and press the valve stem 63 so as to switch the load-adjusting unit 6 from the locked state to the movable state.

Figure 9:
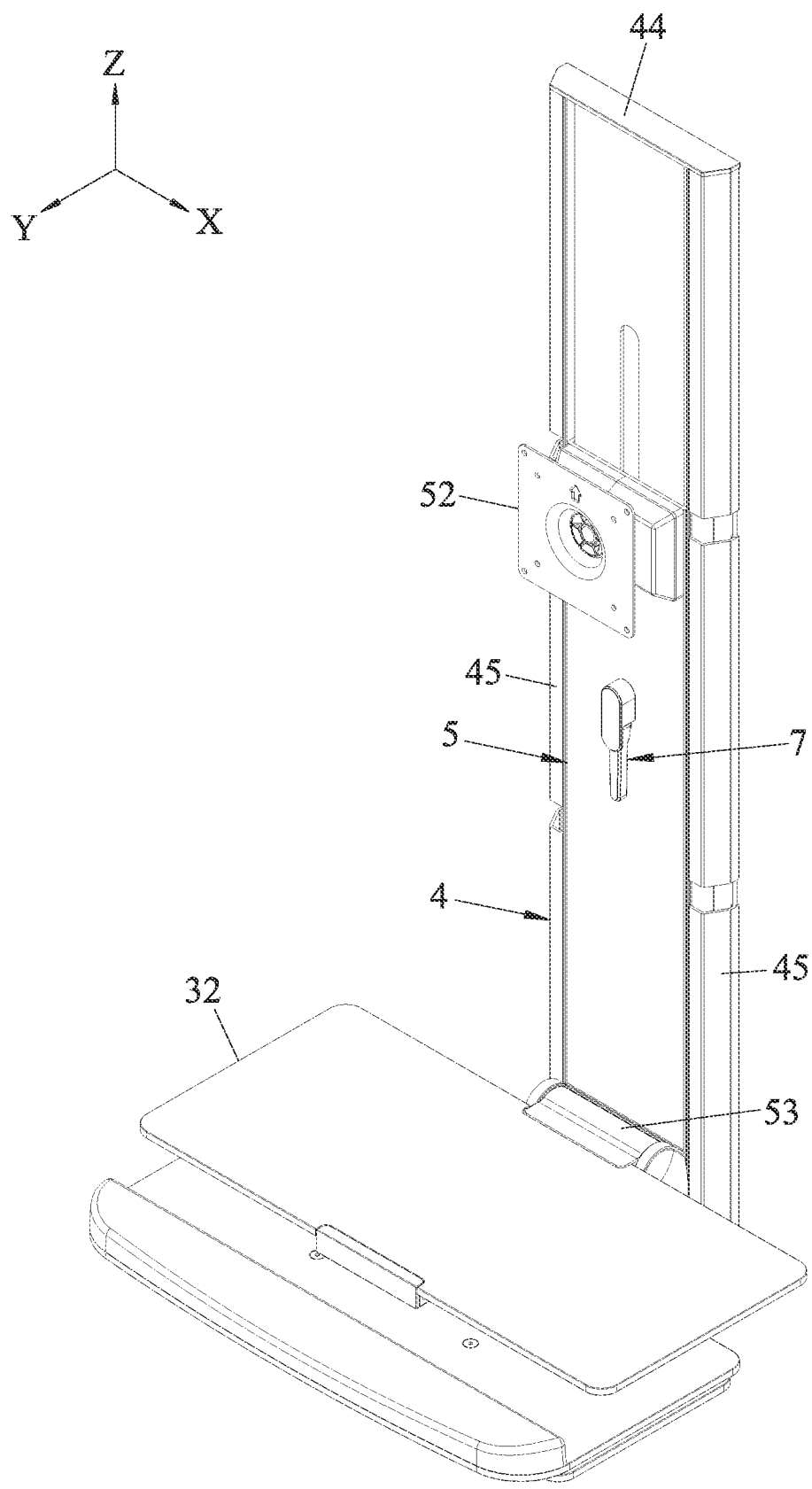
FIG. 9 is a view similar to FIG. 2, but illustrating a change in the position of a sliding unit.

Referring to FIG. 9, in combination with FIGS. 2 and 5, by pushing the sliding unit 5 to move in the length direction (Z), the sliding unit 5 can slide smoothly along the slide grooves 422 of the slide frame 4 through the sliding portions 511 thereof, and can change the height of the display screen 31 and the work platform 32 to facilitate their operation by the user in a sitting or standing position.

Figure 10:
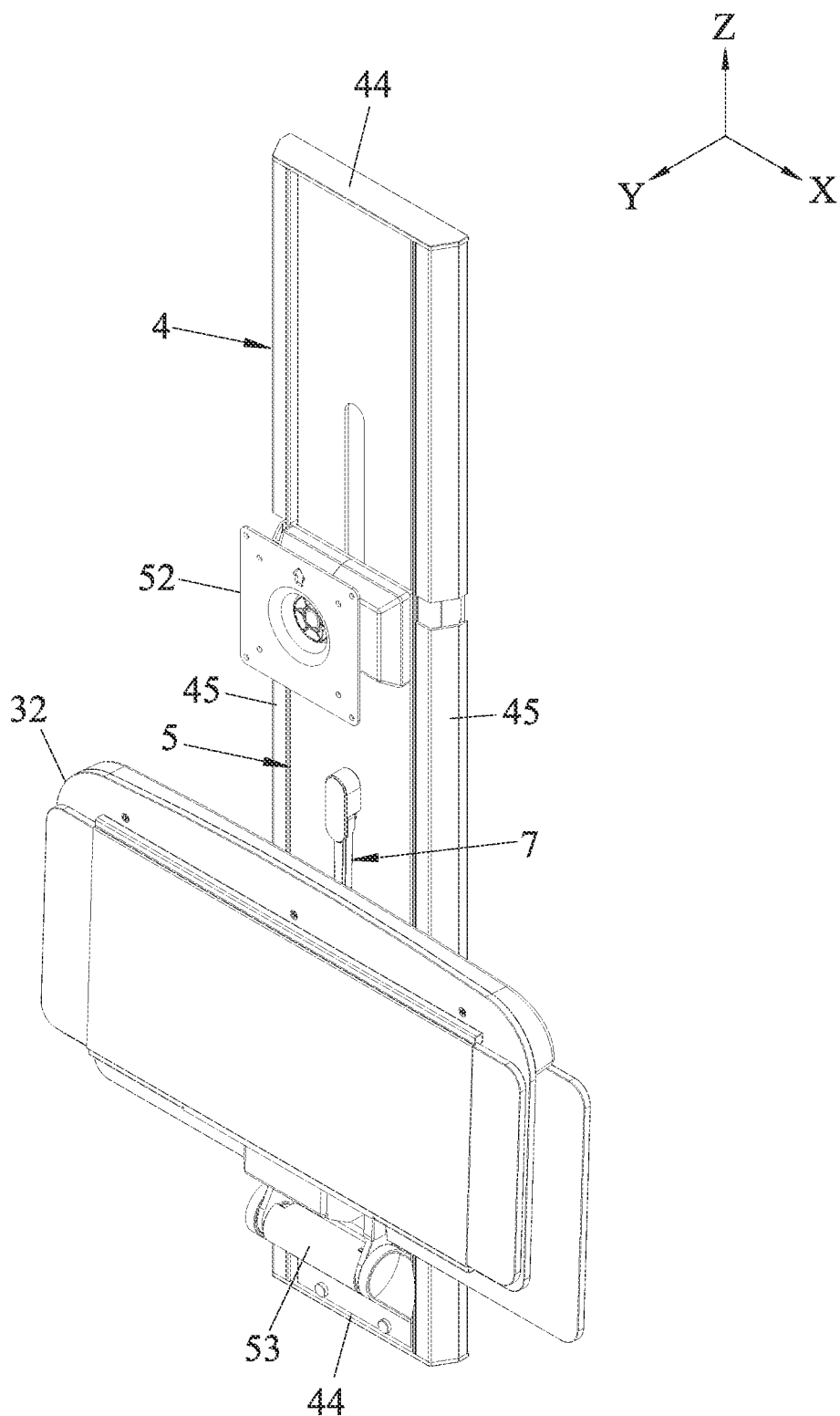
FIG. 10 is a view similar to FIG. 9, but with a work platform in a folded state.

It is worth to mention herein that the work platform 32 may be rotated to a folded position that overlaps with the slide frame 4 in the front-rear direction (Y), as shown in FIG. 10.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A support device suitable for mounting on a wall surface and suitable for connection with at least one of a display screen and a work platform, said support device comprising:
    a slide frame including a front plate extending along a length direction, and two side plates respectively connected to two opposite lateral sides of said front plate and spaced apart from each other in a width direction transverse to the length direction, said side plates and said front plate cooperatively defining a receiving space that has an opening suitable for facing the wall surface, each of said side plates further cooperating with said front plate to define a slide groove that has an opening opposite to said opening of said receiving space;
    a sliding unit slidable on said slide frame in the length direction and suitable for connection with the at least one of the display screen and the work platform, said sliding unit having two sliding portions spaced apart from each other in the width direction, each of said sliding portions being slidably disposed in said slide groove defined by said front plate and a corresponding one of said side plates;
    a load-adjusting unit disposed in said receiving space and connected to said slide frame and said sliding unit, said load-adjusting unit being switchable between a movable state, in which said load-adjusting unit is movable to extend and retract in the length direction and brings said sliding unit to move therealong, and a locked state, in which said load-adjusting unit generates a supporting force that supports said sliding unit to maintain at a desired fixed point, and
    a control unit disposed on said sliding unit and including an operating member for controlling the movement of said load-adjusting unit;
    wherein said load-adjusting unit is a locking cylinder, and includes a cylinder bad connected to said front plate, a piston rod retractably disposed in said cylinder body and connected to said sliding unit, and a valve stem extending through said piston rod and driven by said operating member, said valve stem being used for preventing retractable movement of said piston rod to place said load-adjustinq unit in the locked state and being also used for allowing retractable movement of said piston rod to place said load-adjusting unit in the movable state; and
    wherein said front plate has a passage formed therethrough and extending in the length direction for communicating said receiving space with an external environment, said control unit further including a bolt rotatably inserted through said sliding member and said passage, said bolt having an eccentric portion located in said receiving space, and a drive portion opposite to said eccentric portion and connected to said operating member, said eccentric portion having a first contact face and a second contact face for contact with said valve stem, said first contact face and said second contact face having a position difference in the length direction, and wherein, when said first contact face contacts said valve stem, said first contact face presses said valve stem and allows said piston rod to extend and retract, and when said second contact face contacts said valve stem, said valve stem is released from being pressed, and said piston rod is prevented from extending and retracting.

2. The support device as claimed in claim 1, wherein each of said side plates has a flank portion spaced apart from said front plate in the width direction, a plate-connecting portion connected between said front plate and said flank portion and cooperating with said front plate and said flank portion to define said slide groove, and a wall-connecting portion that is connected to a junction of said flank portion and said plate-connecting portion and that is suitable for connection with the wall surface.

3. The support device as claimed in claim 2, wherein said slide frame further includes a plurality of decorative plates, said flank portion of each of said side plates having a first engaging portion formed on one end thereof, said wall-connecting portion of each of said side plates having a second engaging portion formed on one end thereof, each of said decorative plates being detachably connected to a respective one of said side plates and cooperating with the respective one of said side plates to define a wire-embedding space, each of said decorative plates having a third engaging portion and a fourth engaging portion formed on two opposite ends thereof, said third engaging portion engaging with said first engaging portion, said fourth engaging portion engaging with said second engaging portion.

4. The support device as claimed in claim 3, wherein one of said first and third engaging portions is a protruding portion, and the other one of said first and third engaging portions is a recess portion, and wherein one of said second and fourth engaging portions is a protruding portion, and the other one of said second and fourth engaging portions is a recess portion.

5. The support device as claimed in claim 1, wherein said sliding unit includes a sliding member slidable on said slide frame in the length direction and having said sliding portions, each of said sliding portions having an L-shape.

6. The support device as claimed in claim 5, wherein said sliding unit further includes a mounting seat connected to said sliding member and suitable for connection with the display screen, and a pivot seat connected to said sliding member and suitable for connection with the work platform, said pivot seat being spaced apart from said mounting seat in the length direction, and being located at a height lower than that of said mounting seat.

7. The support device as claimed in claim 1, wherein said control unit further includes a limiting cap connected to and cooperating with said sliding unit to define a first opening and a second opening for extension of said operating member therethrough, said first opening and said second opening being immediately adjacent to and communicating with each other, said limiting cap limiting the rotation of said operating member from said first opening to said second opening and vice versa.

8. The support device as claimed in claim 1, wherein said control unit further includes a limiting assembly, said bolt further having two concave portions spaced apart by an angle, a range of the rotation of said operating member between said first opening and said second opening corresponding to said angle between said concave portions, said angle ranging from 60 to 100 degrees, said limiting assembly including a shaft seat, a ball and an elastic member, said shaft seat being connected to said sliding unit and having a through hole extending in the thickness direction for receiving said eccentric portion of said bolt, and a through slot extending in the length direction and communicating with said through hole, said through slot allowing said valve stem and said limiting assembly to pass therethrough in opposite directions, said ball being disposed between said elastic member and said eccentric portion of said bolt, said elastic member generating a biasing force for engaging said ball with any one of said concave portions.

* * * * *